United States Patent
Nagaraja et al.

(10) Patent No.: US 11,277,869 B2
(45) Date of Patent: Mar. 15, 2022

(54) SYSTEMS AND METHODS FOR USE OF UE LATENCY REQUIREMENT FOR SYNCHRONIZATION SIGNAL BLOCK SELECTION

(71) Applicant: QUALCOMM Incorporated, San Diego, CA (US)

(72) Inventors: Sumeeth Nagaraja, Los Altos, CA (US); Muhammad Nazmul Islam, Littleton, MA (US); Sundar Subramanian, San Diego, CA (US); Tao Luo, San Diego, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/631,402

(22) PCT Filed: Jul. 25, 2018

(86) PCT No.: PCT/CN2018/097074
§ 371 (c)(1),
(2) Date: Jan. 15, 2020

(87) PCT Pub. No.: WO2019/037568
PCT Pub. Date: Feb. 28, 2019

(65) Prior Publication Data
US 2020/0214042 A1    Jul. 2, 2020

(30) Foreign Application Priority Data

Aug. 23, 2017 (WO) ............... PCT/CN2017/098681

(51) Int. Cl.
*H04W 74/08* (2009.01)
*H04W 76/19* (2018.01)
(Continued)

(52) U.S. Cl.
CPC ...... *H04W 74/0833* (2013.01); *H04B 7/0695* (2013.01); *H04W 16/28* (2013.01);
(Continued)

(58) Field of Classification Search
CPC ............. H04W 74/0833; H04W 74/02; H04W 74/0891; H04W 74/006; H04W 76/19;
(Continued)

(56) References Cited

U.S. PATENT DOCUMENTS 8,345,627 B2    1/2013 Lott
8,948,154 B2    2/2015 Gaal et al.
(Continued)

FOREIGN PATENT DOCUMENTS

CN        1450730 A      10/2003
CN      101635624 A       1/2010
(Continued)

OTHER PUBLICATIONS

International Search Report and Written Opinion—PCT/CN2017/098681—ISA/EPO—dated May 14, 2018.
(Continued)

*Primary Examiner* — Ricardo H Castaneyra
(74) *Attorney, Agent, or Firm* — Arent Fox, LLP

(57) ABSTRACT

A user equipment (UE) may initiate a random access (RACH) procedure using an uplink resource selected based on a corresponding received synchronization signal block. The UE may detect a random access procedure trigger. The UE may configure a selection threshold time. The selection threshold time may be based at least in part on a latency requirement of the UE. The UE may select a synchronization signal block having a corresponding uplink resource within the selection threshold time. The synchronization signal block and corresponding uplink resource satisfy one or more
(Continued)

parameters or conditions. The UE may transmit a random access preamble on the corresponding uplink resource.

24 Claims, 8 Drawing Sheets

(51) Int. Cl.
*H04B 7/06* (2006.01)
*H04W 16/28* (2009.01)
*H04W 36/08* (2009.01)
*H04W 74/02* (2009.01)

(52) U.S. Cl.
CPC ............ *H04W 36/08* (2013.01); *H04W 74/02* (2013.01); *H04W 74/0891* (2013.01); *H04W 76/19* (2018.02)

(58) Field of Classification Search
CPC . H04W 16/28; H04W 36/08; H04W 56/0015; H04W 56/0005; H04W 56/00; H04W 48/16; H04B 7/0695; H04L 5/0051
See application file for complete search history.

(56) References Cited

U.S. PATENT DOCUMENTS

| | | | |
|---|---|---|---|
| 2010/0111032 A1 | 5/2010 | Wu | |
| 2011/0078438 A1 | 3/2011 | Tie et al. | |
| 2011/0216732 A1* | 9/2011 | Maeda | H04W 8/02 370/329 |
| 2011/0249641 A1* | 10/2011 | Kwon | H04W 74/0858 370/329 |
| 2013/0189949 A1 | 7/2013 | Tanaba | |
| 2017/0094624 A1 | 3/2017 | Balachandran et al. | |
| 2018/0020382 A1* | 1/2018 | Kim | H04L 1/1819 |
| 2020/0154326 A1* | 5/2020 | Deenoo | H04W 24/08 |

FOREIGN PATENT DOCUMENTS

| | | |
|---|---|---|
| CN | 102781086 A | 11/2012 |
| CN | 106507439 A | 3/2017 |
| CN | 106851812 A | 6/2017 |
| EP | 1705939 A1 | 9/2006 |
| WO | 2011100479 A1 | 8/2011 |

OTHER PUBLICATIONS

Written Opinion of the International Searching Authority—PCT/CN2018/097074 dated Nov. 7, 2018.

International Search Report—PCT/CN2018/097074 dated Nov. 7, 2018.

Mobility M., et al., "RACH Resource Configuration and Selection", 3GPP Draft, 3GPP TSG RAN WG1 Meeting #90, R1-1714216, RACH Resource Configuration and Selection, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP0513170045, 4 Pages, Retrieved from the Internet: URL: http://www.3gpp.org/ftp/Meetings_3GPP_SYNC/RAN1/Docs/. [retrieved on Aug. 20, 2017] Section 3.

Qualcomm Incorporated: "Power Ramping and Power Control for RACH Procedure", 3GPP Draft, 3GPP TSG RAN WG1 Meeting #90, R1-1713381, Power Ramping and Power Control for RACH Procedure, 3rd Generation Partnership Project (3GPP), Sophia-Antipolis Cedex, France, vol. RAN WG1, No. Prague, Czech Republic, Aug. 21, 2017-Aug. 25, 2017, Aug. 20, 2017, XP051316186, 4 Pages, Retrieved from the Internet: URL: http://www.3gpp.org/ftp/Meetings_3GPP_SYNC/RAN1/Docs/. [retrieved on Aug. 20, 2017] Section 2.

Supplementary European Search Report—EP18848568—Search Authority—The Hague—dated Apr. 29, 2021.

ZTE: "Power Control During Random Access Procedure", 3GPP Draft, 3GPP TSG-RAN WG1 Meeting #90, R1-1712066, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051314886, 8 Pages, Retrieved from the Internet: URL: http://www.3gpp.org/ftp/Meetings_3GPP_SYNC/RAN1/Docs/. [retrieved on Aug. 20, 2017] Section 3.

* cited by examiner

SYSTEMS AND METHODS FOR USE OF UE LATENCY REQUIREMENT FOR SYNCHRONIZATION SIGNAL BLOCK SELECTION

CROSS-REFERENCE TO RELATED APPLICATIONS

This application is a 35 U.S.C.§ 371 National Phase of PCT Application No. PCT/CN2018/097074, filed Jul. 25, 2018, which claims priority to PCT Application No. PCT/CN2017/098681, filed Aug. 23, 2017. The disclosures of the priority applications are hereby incorporated by reference in their entirety.

BACKGROUND

Aspects of the present disclosure relate generally to wireless communication networks, and more particularly, to communications between a user equipment (UE) and one or more base stations.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current handover solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including a method of wireless communications. The method includes detecting, by a user equipment (UE), a random access procedure trigger. The method includes configuring a selection threshold time. The method includes selecting a synchronization signal block having a corresponding uplink resource within the selection threshold time, wherein the synchronization signal block and corresponding uplink resource satisfy one or more parameters or conditions. The method includes transmitting a random access preamble on the corresponding uplink resource.

In another aspect, the present disclosure provides a UE including a memory and a processor in communication with the memory. The processor may be configured to detect, at the UE, a random access procedure trigger. The processor may be configured to configure a selection threshold time. The processor may be configured to select a synchronization signal block having a corresponding uplink resource within the selection threshold time from the random access procedure trigger, wherein the synchronization signal block and corresponding uplink resource satisfy one or more parameters or conditions. The processor may be configured to transmit a random access preamble on the corresponding uplink resource.

In another aspect, the present disclosure provides a UE. The UE may include means for detecting, by the UE, a random access procedure trigger. The UE may include means for configuring a selection threshold time. The UE may include means for selecting a synchronization signal block having a corresponding uplink resource within the selection threshold time from the random access procedure trigger, wherein the synchronization signal block and corresponding uplink resource satisfy one or more parameters or conditions. The UE may include means for transmitting a random access preamble on the corresponding uplink resource.

In another aspect, the present disclosure provides a computer-readable medium storing computer code executable by a processor for wireless communications. The computer-readable medium may include one or more codes executable to detect, by a UE, a random access procedure trigger. The computer-readable medium may include one or more codes executable to configure a selection threshold time. The computer-readable medium may include one or more codes executable to select a synchronization signal block having a corresponding uplink resource within the selection threshold time from the random access procedure trigger, wherein the synchronization signal block and corresponding uplink resource satisfy one or more parameters or conditions. The computer-readable medium may include one or more codes executable to transmit a random access preamble on the corresponding uplink resource.

In another aspect, the present disclosure provides a method of wireless communications. The method may include transmitting, by a network entity, a synchronization signal including a plurality of synchronization signal blocks, each synchronization signal block having a corresponding uplink resource. The method may include determining, by the network entity, a latency requirement of a UE. The method may include determining, based on the latency requirement, a selection threshold time for the UE to search to find a synchronization signal block of the transmitted synchronization signal blocks and the corresponding uplink resource that satisfy one or more parameters or conditions. The method may include configuring the UE with the selection threshold time.

In another aspect, the present disclosure provides a network entity including a memory and a processor in communication with the memory. The processor is configured to transmit, by the network entity, a synchronization signal including a plurality of synchronization signal blocks, each synchronization signal block having a corresponding uplink resource. The processor is configured to determine, by the network entity, a latency requirement of a UE. The processor is configured to determine, based on the latency requirement, a selection threshold time for the UE to search to find one synchronization signal block of the transmitted synchronization signal blocks and the corresponding uplink resource that satisfy one or more parameters or conditions. The processor is configured to configure the UE with the selection threshold time.

In another aspect, the present disclosure provides a network entity for wireless communications, including means for transmitting, by the network entity, a synchronization signal including a plurality of synchronization signal blocks, each synchronization signal block having a corresponding uplink resource. The network entity includes means for determining, by the network entity, a latency requirement of a UE. The network entity includes means for determining, based on the latency requirement, a selection threshold time for the UE to search to find one synchronization signal block of the transmitted synchronization signal blocks and the corresponding uplink resource that satisfy one or more parameters or conditions. The network entity includes means for configuring the UE with the selection threshold time.

In another aspect, the present disclosure provides a computer-readable medium (e.g., a non-transitory computer-readable medium) storing computer code executable by a processor for wireless communications. The computer-readable medium may include code to transmit, by the network entity, a synchronization signal including a plurality of synchronization signal blocks, each synchronization signal block having a corresponding uplink resource. The computer-readable medium may include code to determine, by the network entity, a latency requirement of a UE. The computer-readable medium may include code to determine, based on the latency requirement, a selection threshold time for the UE to search to find one synchronization signal block of the transmitted synchronization signal blocks and the corresponding uplink resource that satisfy one or more parameters or conditions. The computer-readable medium may include code to configure the UE with the selection threshold time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
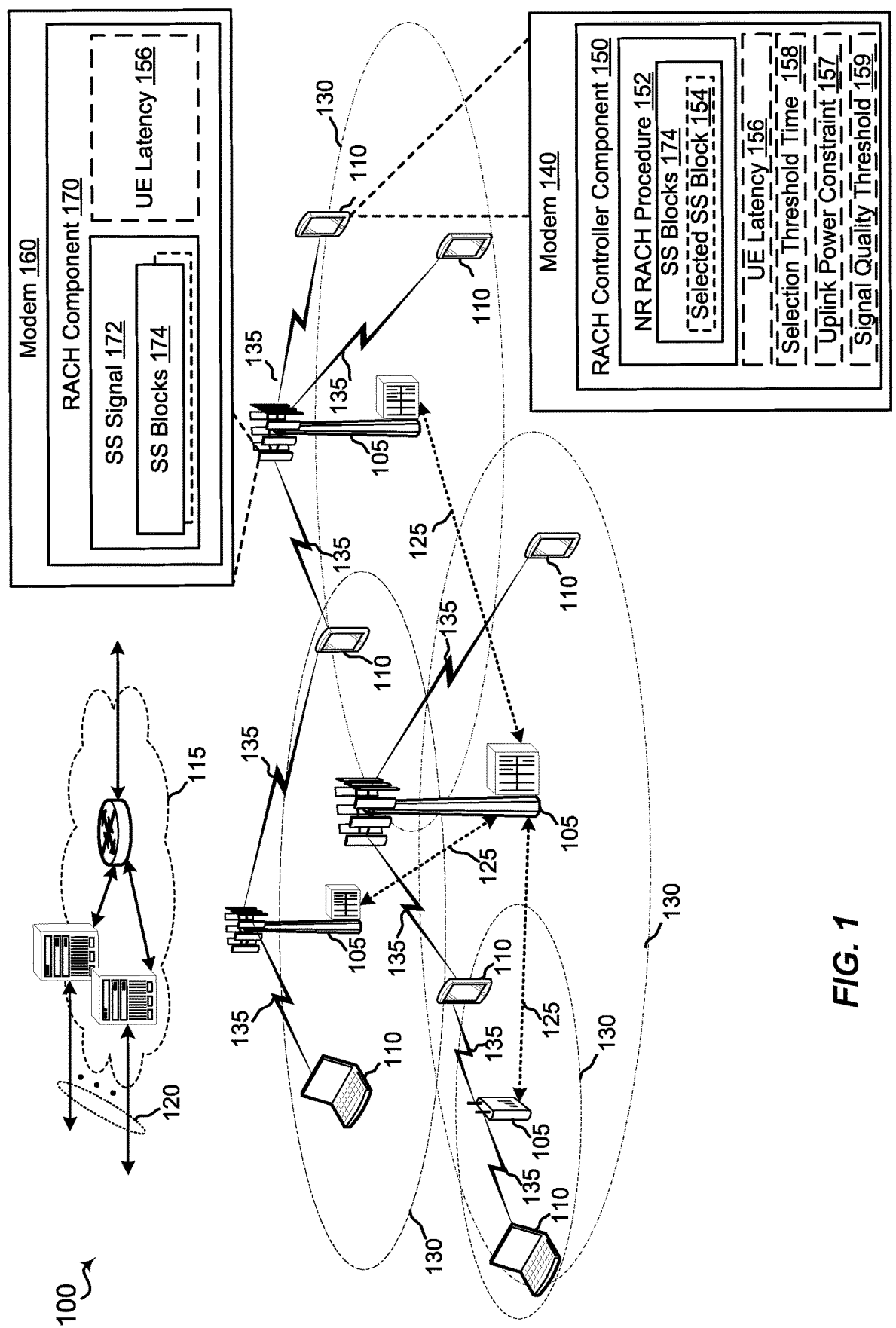
FIG. 1 is a schematic diagram of an example wireless communication network including at least one user equipment (UE) having a RACH controller component configured according to this disclosure to transmit a RACH message using an uplink resource selected based on a synchronization signal block.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to selection of a synchronization signal (SS) block for a new radio (NR) RACH procedure that may be executed by a UE and a base station, resulting in reduced latency for handover procedures that may be more efficient than existing RACH procedures and timelines. For example, the configurable NR RACH procedure may utilize a UE latency requirement to determine a threshold time for selecting an SS block. Accordingly, a UE configured with a short latency requirement may quickly select any suitable SS block, while a UE configured with a longer latency requirement may wait for an SS block that allows the UE to meet a target RACH RX power. Further, the present disclosure may include additional features, such as control of maximum permissible exposure (MPE) to further enhance the disclosed configurable NR RACH procedure.

Additional features of the present aspects are described in more detail below with respect to FIGS. 1-8.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a random access channel (RACH) controller component 150 that manages execution of a new radio (NR; also referred to as 5G) RACH procedure 152, in communication with a base station 105, resulting in selection of one of the SS blocks 174 for use in the NR RACH procedure 152. For example, NR RACH procedure 152 may include selecting a selected SS block 154 from among received SS blocks 174 that allows the UE 110 to meet a target RACH RX power. In an aspect, the RACH controller component 150 may select the selected SS block 154 based on a UE latency requirement 156. For example, the RACH controller component 150 may configure a selection threshold time 158 based on the UE latency requirement 156. The RACH controller component 150 may then select the selected SS block 154 from among the received SS blocks 174 within the selection threshold time 158. For example, the RACH controller component 150 may select one of the SS blocks 174 received during the selection threshold time 158 that meets an uplink power constraint 157 and a signal quality threshold 159 as the selected SS block 154. The SS block selection may further be based on the given use case, or the given deployment case, as will be discussed below in more detail. Further, the wireless communication network 100 includes at least one base station 105 with a modem 160 having a RACH component 170 that manages execution of NR RACH procedure 152, in communication with UE 110, resulting in a given one of the one or more RACH timelines. The RACH component 170, independently or in combination with RACH controller component 150 of UE 110, may utilize the SS blocks 174, the given use case, or the given deployment case, as will be discussed below in more detail. Thus, according to the present disclosure, NR RACH procedure 152 may be executed in a manner that improves an efficiency of UE 110 in randomly accessing base station 105 and establishing a wireless communication connection.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies.

Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
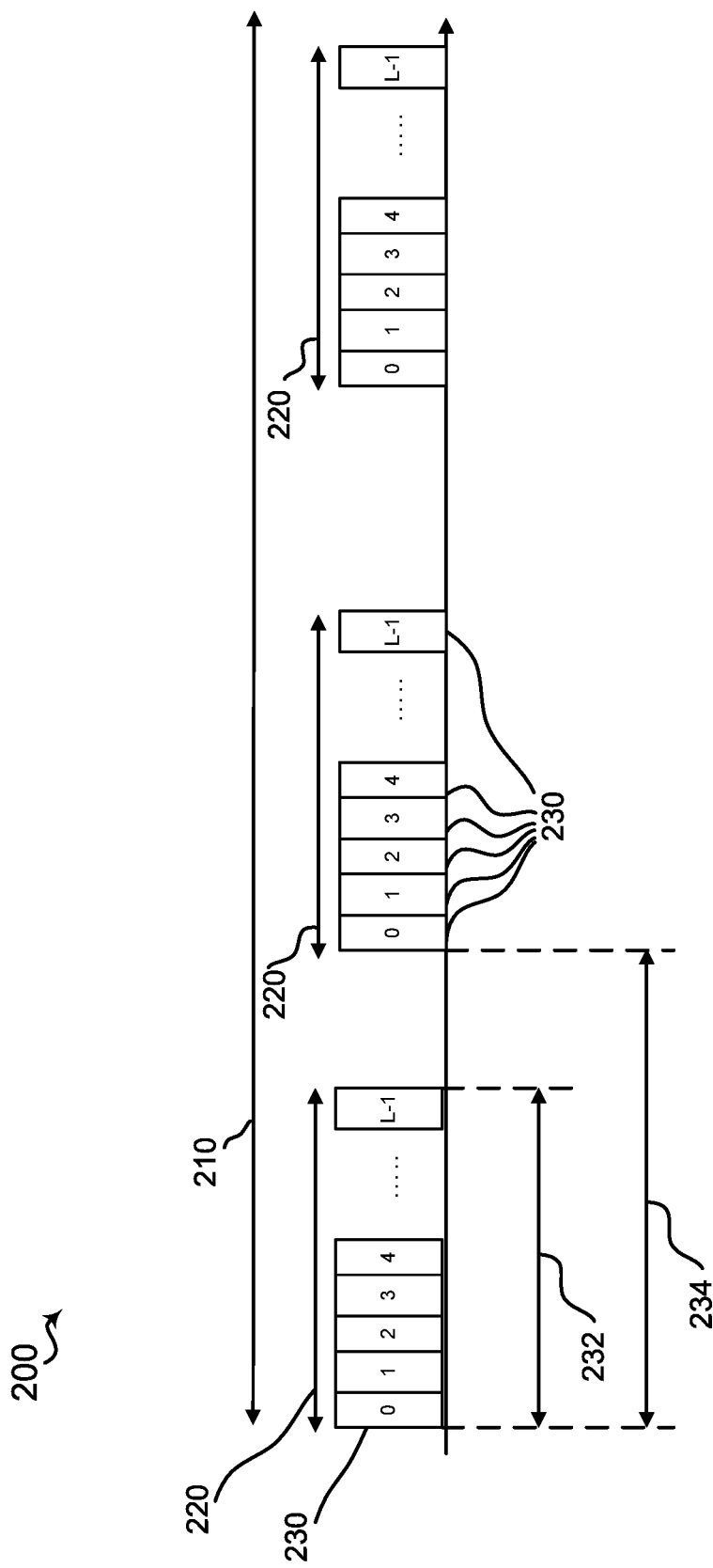
FIG. 2 is a conceptual diagram of an example synchronization signal including multiple synchronization signal blocks.

Referring to FIG. 2, a base station 105 may transmit a synchronization signal 210 (or synchronization signal burst series) for UEs to perform cell detection and measurement. For certain frequency bands (e.g., >6 GHz or mmWave), the synchronization signal 210 may be transmitted in the form of a sweeping beam. The sweeping beam may include a periodic synchronization signal burst 220 of synchronization signal blocks (SS blocks) 230. For example, the SS-burst 220 may include L SS blocks 230. In an example, the number of SS-blocks L may be 64. The SS-burst 220 may have a duration 232 and a periodicity 234. The SS blocks 230 may include an NR primary synchronization signal (NR-PSS), an NR secondary synchronization signal (NR-SSS), and an NR Physical broadcast channel (NR-PBCH). The SS-burst 220 composes multiple SS blocks 230 to enable repetitive transmissions of SS-blocks in different directions for multi-beam configurations. A SS-burst set includes multiple SS-bursts to complete the beam sweeping of a coverage area. For multi-beam configuration, it should be possible to transmit SS-blocks from the same beam multiple times within one SS-burst. The number of SS-bursts within a SS-burst set and the number of SS-blocks within a SS-burst may be determined based on the deployment scenario and operating frequency band. For example, the number of SS-blocks within a SS-burst in the deployment scenario of beam sweeping in multi-beam configuration may be determined by the number of beams and the DL/GP/UL configuration. In order to complete beam-sweeping the coverage area, each beam may have at least one S S-block transmission over the sweeping interval. The number of SS-bursts within a SS-burst set and SS-blocks within a SS-burst may be flexibly determined in the deployment.

Figure 3:
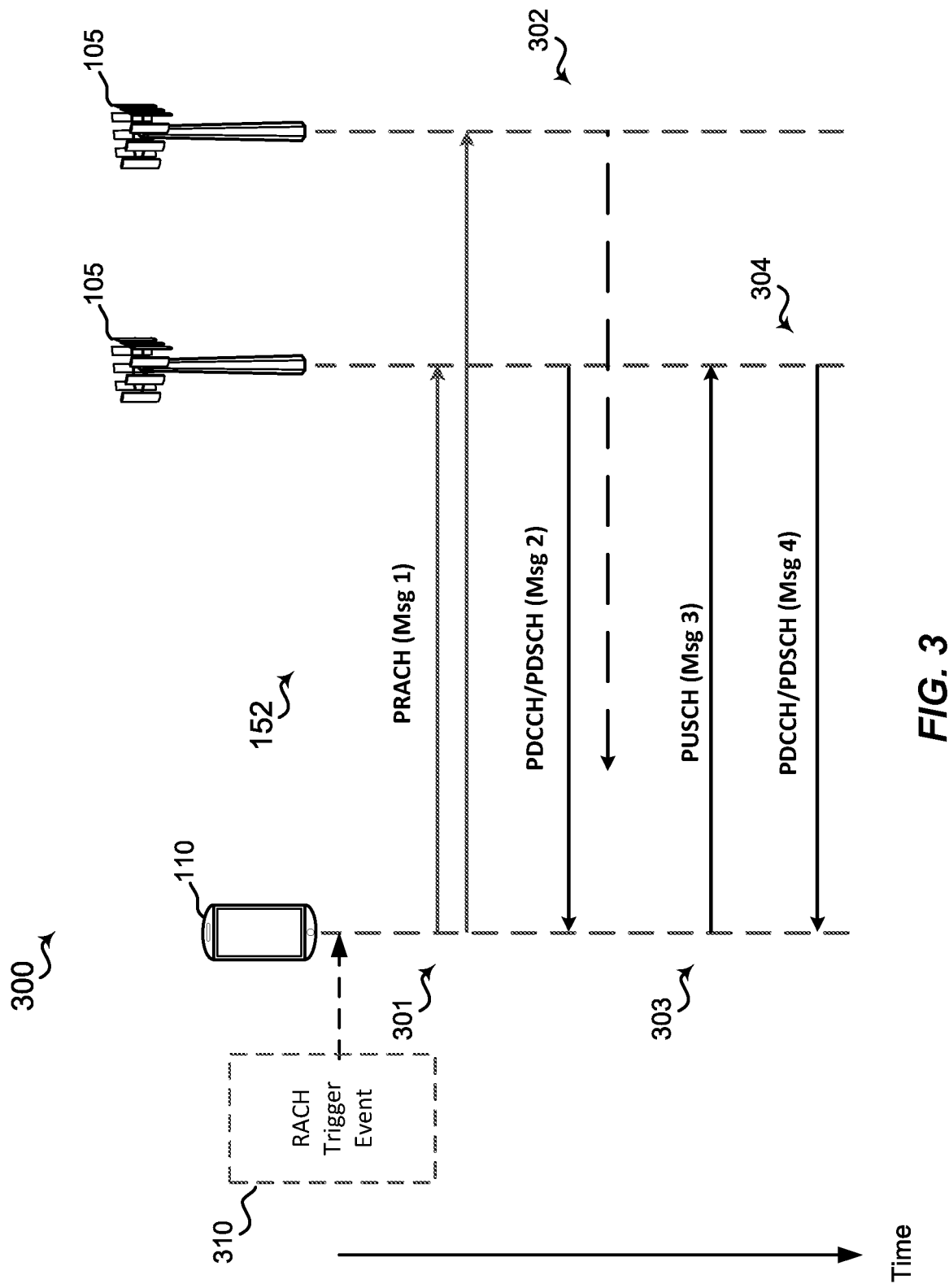
FIG. 3 is a message diagram of an example RACH procedure.

Referring additionally to FIG. 3 and Table 1 (below), during operation, UE 110 may execute an implementation of NR RACH procedure 152 of the present disclosure, according to a 4-step NR RACH message flow 300, due to one the occurrence of one or more RACH trigger events 310. Suitable examples of RACH trigger event 310 may include, but are not limited to: (i) an initial access from RRC_IDLE to RRC_CONNECTED ACTIVE; (ii) downlink (DL) data arrival during RRC_IDLE or RRC_CONNECTED INACTIVE; (iii) UL data arrival during RRC_IDLE or RRC_CONNECTED INACTIVE; (iv) a handover during the connected mode of operation; and (v) a connection re-establishment (e.g., a beam failure recovery procedure). NR RACH procedure 152 may be associated with a contention based random access, or with a contention-free random access. In an implementation, a contention based NR RACH procedure 152 corresponds to the following RACH trigger events 310: an initial access from RRC_IDLE to RRC_CONNECTED ACTIVE; UL data arrival during RRC_IDLE or RRC_CONNECTED INACTIVE; and, a connection re-establishment. In an implementation, a contention-free NR RACH procedure 152 corresponds to the following RACH trigger events 310: downlink (DL) data arrival during RRC_IDLE or RRC_CONNECTED INACTIVE; and, a handover during the connected mode of operation.

On the occurrence of any of the above RACH trigger events 310, the execution of NR RACH procedure 152 may include the 4-step NR RACH message flow 300 (see FIG. 3 and Table 1), where the UE 110 exchanges messages with one or more base stations 105 to gain access to a wireless network and establish a wireless communication connection.

TABLE 1

NR RACH procedure 152, including Messages and Message Content transmitted over corresponding Physical (PHY) channel(s).

| PHY Channel | Message | Message content |
|---|---|---|
| PRACH | Msg 1 | RACH Preamble |
| PDCCH/ PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/ PDSCH | Msg 4 | Contention resolution message |

At 301, for example, UE 110 may transmit a first message (Msg 1), which may be referred to as a random access request message, to one or more base stations 105 via a physical channel, such as a physical random access channel (PRACH). For example, Msg 1 may include one or more of a RACH preamble and a resource requirement.

At 302, one of more of the base stations 105 may respond to Msg 1 by transmitting a second message (Msg 2), which may be referred to as a random access response (RAR) message, over a physical downlink control channel (e.g., PDCCH) and/or a physical downlink shared channel (e.g., PDSCH). For example, Msg 2 may include one or more of a detected preamble identifier (ID), a timing advance (TA) value, a temporary cell radio network temporary identifier (TC-RNTI), a backoff indicator, an UL grant, and a DL grant.

At 303, in response to receiving Msg 2, UE 110 transmits a third message (Msg 3), which may be an RRC connection request or a scheduling request, via a physical uplink channel (e.g., PUSCH) based on the UL grant provided in Msg 2. In an aspect, Msg 3 may include a tracking area update (TAU), such as on a periodic basis or if UE 110 moves outside of one or more tracking areas (TAs) initially provided to UE 110 in a tracking area identifier (TAI) list. Also, in some cases, Msg 3 may include a connection establishment cause indicator, which identifies a reason why UE 110 is requesting to connect to the network.

At 304, in response to receiving Msg 3, base station 105 may transmit a fourth message (Msg 4), which may be referred to as a contention resolution message, to UE 110 via a physical downlink control channel (e.g., PDCCH) and/or a physical downlink shared channel (e.g., PDSCH). For example, Msg 4 may include a cell radio network temporary identifier (C-RNTI) for UE 110 to use in subsequent communications.

In the above description, a collision scenario was not discussed but a collision between two or more UEs 110 requesting access can occur. For instance, two or more UEs 110 may send Msg 1 having a same RACH preamble, since the number of RACH preambles may be limited and may be randomly selected by each UE in a contention based NR RACH procedure 152. As such, each UE will receive the same temporary C-RNTI and the same UL grant, and thus each UE may send a similar Msg 3. In this case, base station 105 may resolve the collision in one or more ways: (i) both Msg 3 may interfere with each other, and so base station 105 may not send Msg 4, thus each UE will retransmit Msg 1; (ii) base station 105 may successfully decode only one Msg 3 and send an ACK message to that UE; and (iii) base station 105 may successfully decode both Msg 3s, and then send a Msg 4 having a contention resolution identifier (e.g., an identifier tied to one of the UEs) to both UEs, and each UE receives the Msg 4, decodes it, and determines of they are the correct UE by successfully matching or identifying the contention resolution identifier. It should be noted that such a problem may not occur in a contention-free NR RACH procedure 152, as in this case, base station 105 will inform UE 110 of which RACH preamble to use.

The UE 110 may select physical random access channel (PRACH) resources for the Msg1 transmission based on the SS blocks 174. The selection of the best SS block (e.g., selected SS block 154) during Msg1 transmission allows gNB to find the set of appropriate directions to transmit CSI-RS for the UE. For example, the best SS block may be the SS block 174 received with the highest signal strength or highest signal quality. However, network 100 can also obtain the strongest SS block index of the UE 110 by configuring the UE 110 to convey this information explicitly through Msg3 of contention based random access and implicitly through Msg1 of contention-free random access in dedicated time/frequency regions. The wireless communication network 100 can use this information to determine appropriate CSI-RS directions for the UE 110.

From the perspective of a UE 110, the flexibility of selecting a suitable SS block to transmit Msg1 achieves two benefits: 1) RACH latency reduction and 2) maximum permissible exposure (MPE) regulation. First, NR has defined up to 64 SS blocks within an SS burst set in over-6 GHz. Allocating consecutive RACH resources corresponding to these 64 SS blocks will block DL transmission for a long time. Hence, the RACH resources corresponding to these 64 SS blocks would be distributed over time in different RACH configurations. If the UE 110 has the flexibility to select a suitable SS block to transmit Msg1, the UE 110 can select the earliest RACH resource that allows the UE 110 to meet the target RACH received power at the base station. NR is already considering 'zero latency handover' to speed up the handover process for a UE. Hence, the flexibility to select a suitable SS block to reduce RACH latency is a factor for the handover latency of the UE 110. Therefore, suitable SS block based Msg1 transmission allows the UE 110 to reduce RACH latency.

Second, regulatory agencies such as the Federal Communications Commission (FCC) may impose MPE related regulation, which may prevent a UE 110 to transmit towards a particular direction. In other words, a beam could be strongest in DL but may not be suitable in UL because the direction of the beam may be undesirable due to various regulations. Thus, MPE regulations may prevent the UE 110 from selecting the strongest SS block during Msg1 transmission if a transmission direction corresponding to the strongest SS block of the UE 110 is limited by regulation. Hence, if the UE 110 is forced to select the strongest SS block during Msg1 transmission, the UE 110 may not be allowed to transmit RACH according to FCC regulations. In contrast, if the UE 110 has the flexibility to select a suitable SS block for Msg1 transmission, UE 110 can select a direction that is permissible by regulation.

Whether a UE 110 can meet the required RACH received power depends both on link gain of the selected SS block 154 and the maximum transmission (TX) power of the UE 110. Hence, the wireless communication network 100 may use the maximum transmission or reception power of the UE to set up a threshold, in terms of link gain, to select an SS block. For example, the UE 110 may be configured to select an SS block for RACH transmission if the corresponding RSRP exceeds a threshold. As another example, the UE may be configured to select an SS block for RACH transmission if the corresponding PRACH transmit power is below a threshold. However, in some scenarios, network 100 is not aware of the maximum TX power of the UE 110 during Msg1 transmission of initial access and may be unable to setup these parameters properly. Therefore, network 100 may not be aware of the maximum TX power of the UE 110 during Msg1 transmission of initial access and may not be able to properly setup a threshold, in terms of link gain, to select an SS block. Thus, in some aspects, the UE 110 may select an SS block for a RACH procedure 152 with minimal or reduced network parameter configuration compared to later communications.

In an aspect, the present disclosure provides for the UE 110 selecting, during handover scenarios, the strongest SS block with respect to the selected RX beam of the UE 110, whose RACH resource falls within a selection threshold time 158 (e.g., X ms) from the first available RACH resource after UE 110 receives the handover command or other RACH trigger event 310. The UE 110 has the full flexibility to select the RX beam. If there is no SS block 174, whose RACH resource occurs within the threshold time period from the first available RACH resource after UE 110 receives the handover command that allows UE 110 to meet target RACH RX power, UE 110 has the flexibility to select any SS block that allows UE 110 to meet RACH target RX power with the maximum TX power of the UE 110. For example, the UE 110 may determine a required RACH RX power and SS block transmit power from the SS block. The UE 110 may determine a path loss associated with the SS block (e.g., signaled SSB transmit power−measured SSB receive power). The UE may determine a corresponding RACH transmit power based on a reverse link gain assumption. The UE may select an SS block if the corresponding RACH transmit power is less than or equal to the maximum TX power of the UE.

In an aspect, the value of the selection threshold time 158 depends on a UE latency requirement 156 of the UE 110. The UE latency requirement 156 can be configured by the network. In an aspect, the network 100 is aware of UE's DL traffic status and may select a latency requirement 156 based on the DL traffic status. The UE 110 can also request the value of the selection threshold time 158 from the network based on an UL traffic status of the UE 110. For example, if the UE 110 has a very low latency requirement for UL traffic, selection threshold time 158 can be set to 0 ms and UE 110 has the flexibility to select any suitable SS block. If the UE 110 has no latency requirement, selection threshold time 158 can be equal to a duration where the base station 105 performs a full TX beam sweep (e.g., duration 232). Accordingly, the UE 110 may receive the full set of RACH resources in SS blocks 174 and the UE 110 may select the strongest SS block to transmit Msg1.

Figure 4:
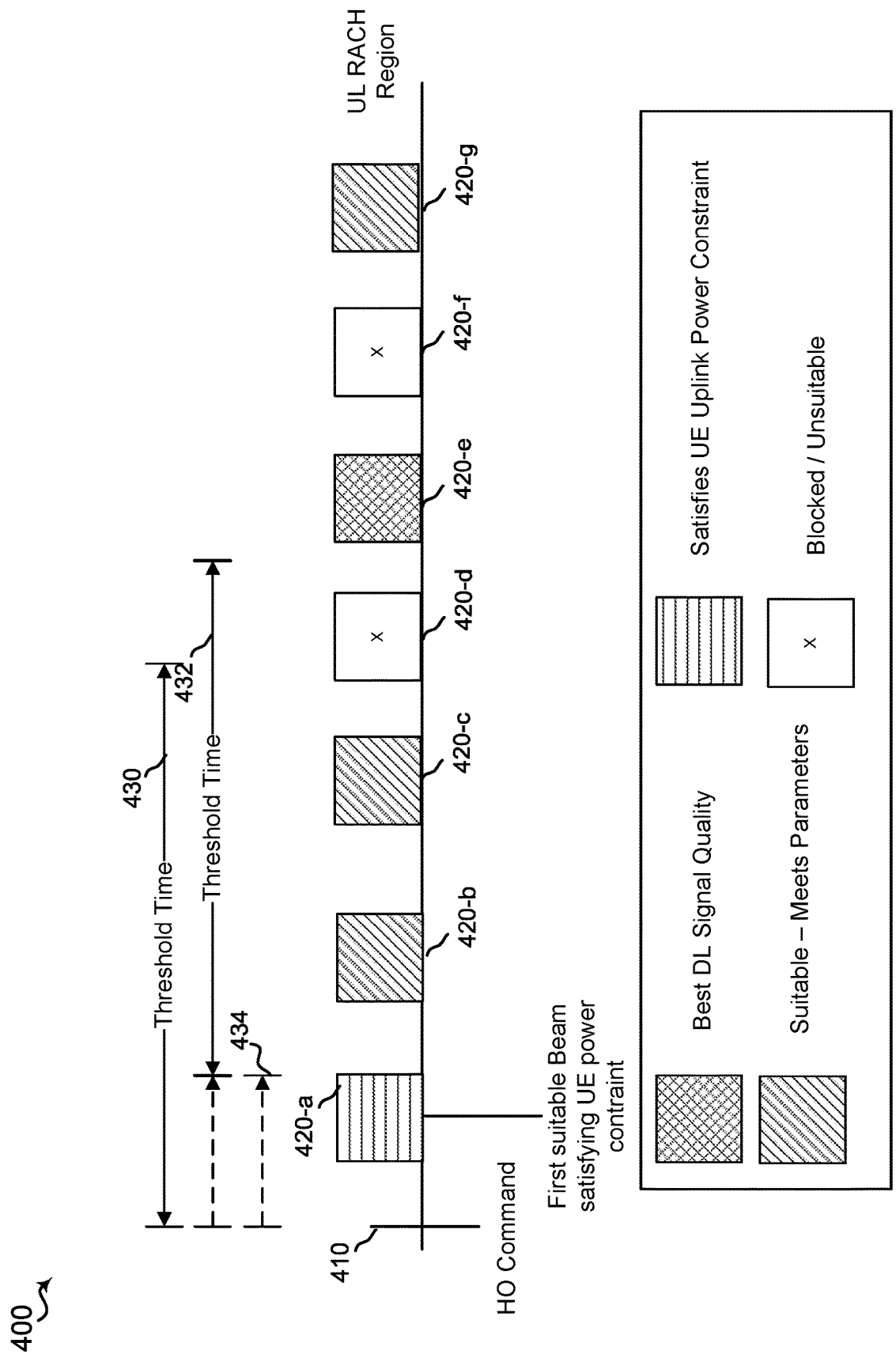
FIG. 4 is a conceptual diagram of an example RACH timeline.

Referring additionally to FIG. 4, a RACH timeline 400 may begin at a trigger event 410 (e.g., a handover command). Uplink resources 420 may be associated with respective uplink regions spaced over time. For example, the base station 105 may perform a receive beam sweep receiving different beams over the duration of the sweep. Each uplink resource 420 may correspond to a respective SS block 230. The UE 110 may be configured with a threshold time 430, 432 as the selection threshold time 158. In an aspect, the threshold time 430 may be measured from the trigger event 410. In some aspects, however, no uplink resource 420 within the threshold time 430 may satisfy a UE power constraint. In an alternative aspect, the threshold time 432 may be measured from a first uplink resource 420-*a* that satisfies the UE uplink power constraint 157. Accordingly, the threshold time 432 may include at least one uplink resource 420 satisfying the UE uplink power constraint 157.

The RACH controller component 150 may determine a downlink signal quality of each SS block 230 corresponding to the uplink resources 420. For example, the RACH controller component 150 may measure a reference signal such as a cell-specific reference signal of the SS-block and determine a signal metric such as a reference signal received power (RSRP), reference signal received quality (RSRQ), or signal-to-noise ratio (SNR). An SS block 230 and corresponding uplink resource 420 may be acceptable for transmitting an uplink RACH Msg1 if the uplink resource 420 satisfies a UE power constraint such as an uplink power constraint 157. For example, the UE 110 may be allowed by MPE regulations or other constraints to transmit on the uplink resource 420 with sufficient power to meet a target RACH Rx power. In contrast, an SS block 230 and corresponding uplink resource 420 may be blocked if MPE regulations or other constraints prevent the UE 110 from transmitting on the uplink resource 420 with sufficient power to meet the target RACH Rx power. In an aspect, the UE 110 may not measure a signal quality of an SS-block corresponding to a blocked uplink resource 420. An SS block 230 and corresponding uplink resource 420 may be considered suitable when a signal quality of the SS block 230 satisfies a threshold determined by the network. A best SS block 230 and corresponding uplink resource 420 may be the SS block 230 among the SS-burst 220 having the highest signal quality.

The duration of the threshold time 430, 432 may provide flexible balance between UE latency and Msg1 quality, which may affect base station performance (e.g., CSI-RS selection). In the illustrated example, the threshold time 430, 432 may include uplink resources 420-*a*, 420-*b*, 420-*c*, and 420-*d*. The uplink resource 420-*a* may satisfy the uplink power constraint 157, but may not satisfy a network selected signal quality threshold 159. The uplink resource 420-*b* may satisfy the uplink power constraint 157 and the network selected signal quality threshold 159. The uplink resource 420-*c* may satisfy the uplink power constraint 157 and the network selected signal quality threshold 159. The uplink resource 420-*d* may be blocked by an MPE requirement and no signal quality may be measured. The RACH controller component 150 may select uplink resource 420-*b* for transmitting the Msg1 because uplink resource 420-*b* is the first uplink resource 420 within the threshold time 430, 432 that satisfies the network selected signal quality threshold.

As an alternative example, if the threshold time 434 were set to zero (measured from a first uplink resource 420-*a* that satisfies the uplink power constraint 157), only the uplink resource 420-*a* would fall within the threshold time 434. Accordingly, the RACH controller component 150 may select uplink resource 420-*a* for transmitting the Msg1 as the only available uplink resource 420. With the threshold time 430 set to 0, the threshold time 430 may not include any acceptable uplink resources 420, so a threshold time of 0 may not be configured when the threshold time 430 is measured from the trigger event 410.

In another example, if the threshold time 430, 432 were longer or unlimited (not shown), the RACH controller component 150 may consider uplink resources 420-*a*, 420-*b*, 420-*c*, 420-*d*, 420-*e*, 420-*f*, and 420-*g*. RACH controller component 150 may select the uplink resource 420-*e* having the best downlink signal quality. It should be appreciated, however, that the Msg1 would be transmitted with greater latency than when the uplink resource 420-*b* is selected.

Figure 5:
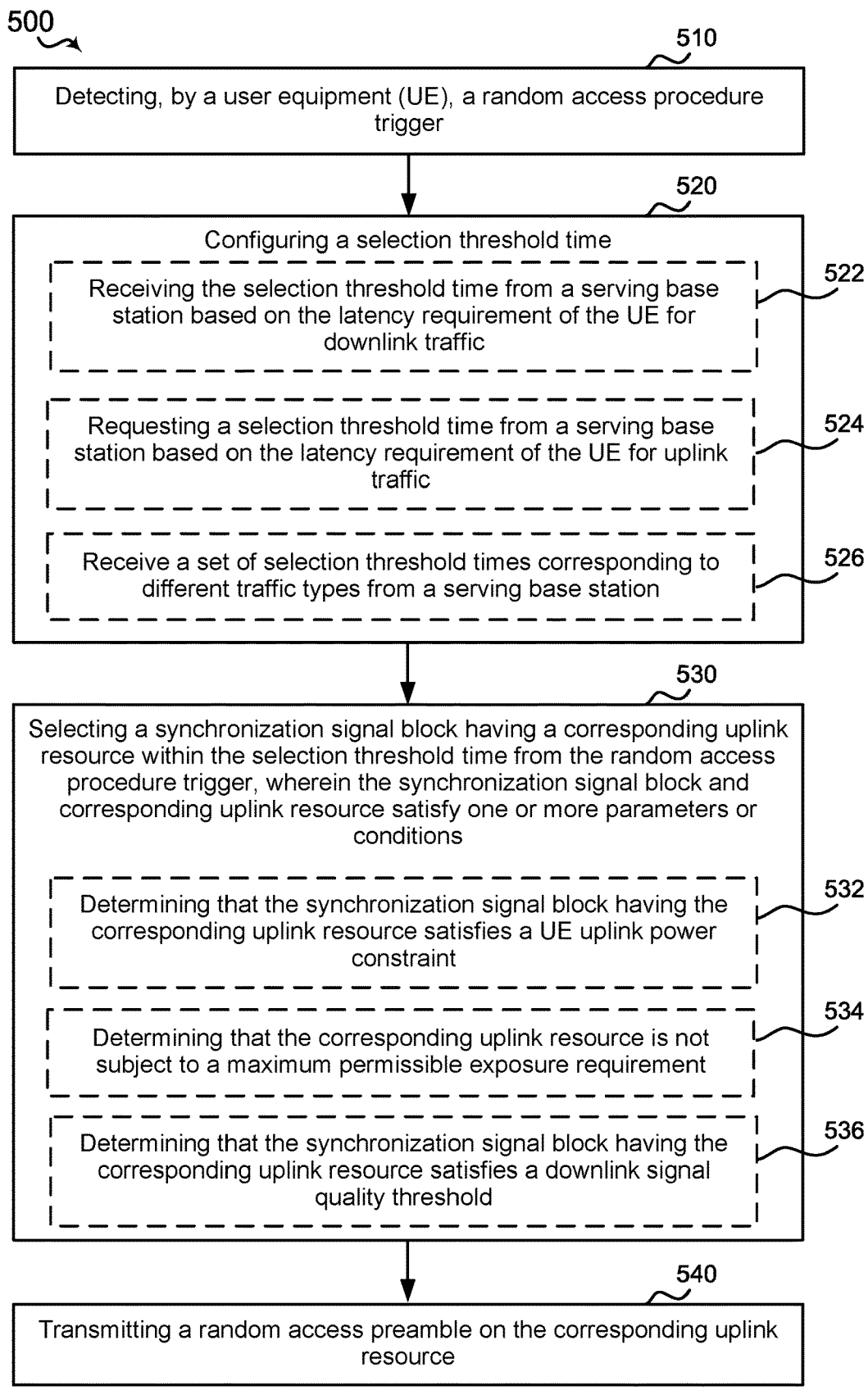
FIG. 5 is a flow diagram of an example method of transmitting a RACH message based on synchronization signal blocks.

Referring to FIG. 5, for example, a method 500 of wireless communication in operating UE 110 according to the above-described aspects to transmit a RACH message includes one or more of the above-defined actions.

For example, at block 510, method 500 includes detecting, by a user equipment (UE), a random access procedure trigger. For instance, in an aspect, UE 110 may execute RACH controller component 150 to a random access procedure trigger, as described herein. For example, the random access procedure trigger may be one of a handover command, an initial access, an idle state change, or a connection re-establishment.

At block 520, method 500 includes configuring a selection threshold time. In an aspect, for example, UE 110 may execute RACH controller component 150 to configure the selection threshold time 158. In an aspect, the selection threshold time may be based at least in part on a UE latency requirement 156 of the UE 110. For example, block 522 may include receiving the selection threshold time from a serving base station based on the latency requirement of the UE 110 for downlink traffic. In an aspect, RACH controller component 150 may receive the selection threshold time 158 from a serving base station 105 based on the latency requirement 156 of the UE 110 for downlink traffic. As another example, block 524 may include requesting a selection threshold time from a serving base station based on the latency requirement of the UE for uplink traffic. In an aspect, RACH controller component 150 may request a selection threshold time from the serving base station 105 based on the latency requirement 156 of the UE for uplink traffic. In another example, block 526 may include receiving a set of selection threshold times corresponding to different traffic types from the serving base station. In an aspect, RACH controller component 150 may receive a set of selection threshold times corresponding to different traffic types from a serving base station 105. The RACH controller component 150 may determine a traffic type of current uplink traffic. The RACH controller component 150 may configure the selection threshold time 158 of the set of selection threshold times corresponding to the traffic type of the current uplink traffic.

At block 530, the method 500 includes selecting a synchronization signal block having a corresponding uplink resource within the selection threshold time from the random access procedure trigger. The synchronization signal block and corresponding uplink resource satisfy one or more parameters or conditions. For instance, in an aspect, UE 110 may execute RACH controller component 150 to select a synchronization signal block 174 having a corresponding uplink resource 420 within the threshold time 430, 432. The RACH controller component 150 may determine whether the synchronization signal block and corresponding uplink resource satisfy one or more parameters or conditions. For example, block 532 may include determining that the synchronization signal block having the corresponding uplink resource satisfies a UE uplink power constraint 157. As another example, block 534 may include determining that the corresponding uplink resource is not subject to a maximum permissible exposure requirement. As another example block 536 may include determining that the synchronization signal block having the corresponding uplink resource satisfies a downlink signal quality threshold 159. The RACH controller component 150 may implement a combination of the above constraints. In an aspect, the RACH controller component 150 may select a synchronization signal block satisfying a network constraint and a UE constraint. For example, the network constraint may be a downlink signal quality threshold 159 and the UE constraint may be a UE uplink power constraint 157 or a random access channel delay threshold.

At block 540, the method 500 includes transmitting a random access preamble on the corresponding uplink resource. In an aspect, for example, the UE 110 may execute RACH controller component 150 to transmit a random access preamble 301 on the corresponding uplink resource. In an aspect, a transmit power for the random access preamble may be based on a downlink signal quality of the selected SS block 154. In another aspect, the transmit power for the random access preamble 301 may be less than or equal to a maximum transmit power of the UE 110.

Figure 6:
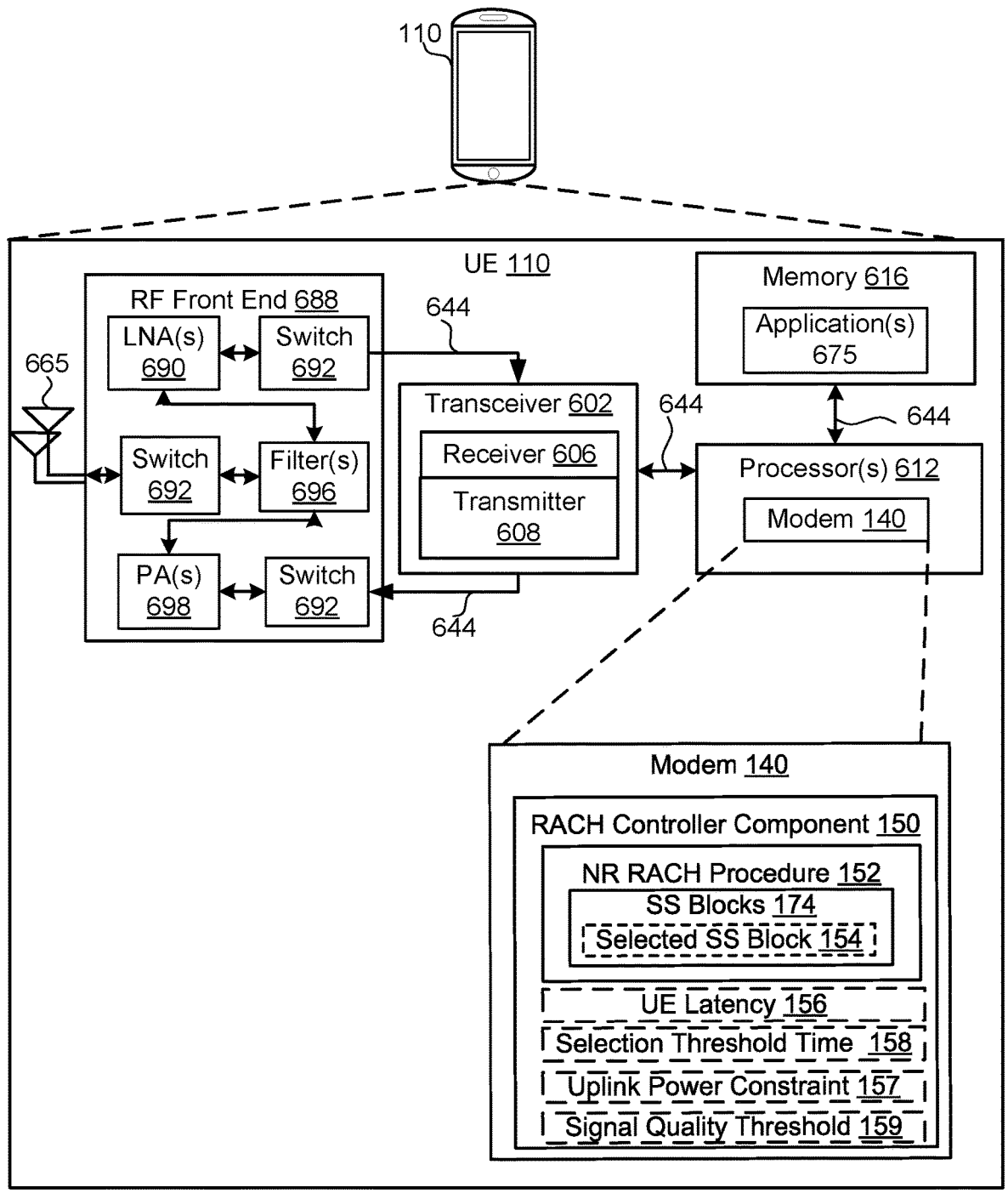
FIG. 6 is a schematic diagram of example components of the UE of FIG. 1.

Referring to FIG. 6, one example of an implementation of UE 110 may include a variety of components, some of which have already been described above, but including components such as one or more processors 612 and memory 616 and transceiver 602 in communication via one or more buses 644, which may operate in conjunction with modem 140 and RACH controller component 150 to enable one or more of the functions described herein related to transmitting a RACH Msg1. Further, the one or more processors 612, modem 614, memory 616, transceiver 602, RF front end 688 and one or more antennas 686, may be configured to support voice and/or data calls (simultaneously or non-simultaneously) in one or more radio access technologies.

In an aspect, the one or more processors 612 can include a modem 614 that uses one or more modem processors. The various functions related to RACH controller component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with RACH controller component 150 may be performed by transceiver 602.

Also, memory 616 may be configured to store data used herein and/or local versions of applications 675 or RACH controller component 150 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining RACH controller component 150 and/or one or more of its subcomponents, and/or data associated therewith, when UE 110 is operating at least one processor 612 to execute RACH controller component 150 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 602 to operate at a specified frequency and power level based on the UE configuration of the UE 110 and the communication protocol used by modem 140.

In an aspect, modem 140 can be a multiband-multimode modem, which can process digital data and communicate with transceiver 602 such that the digital data is sent and received using transceiver 602. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 7:
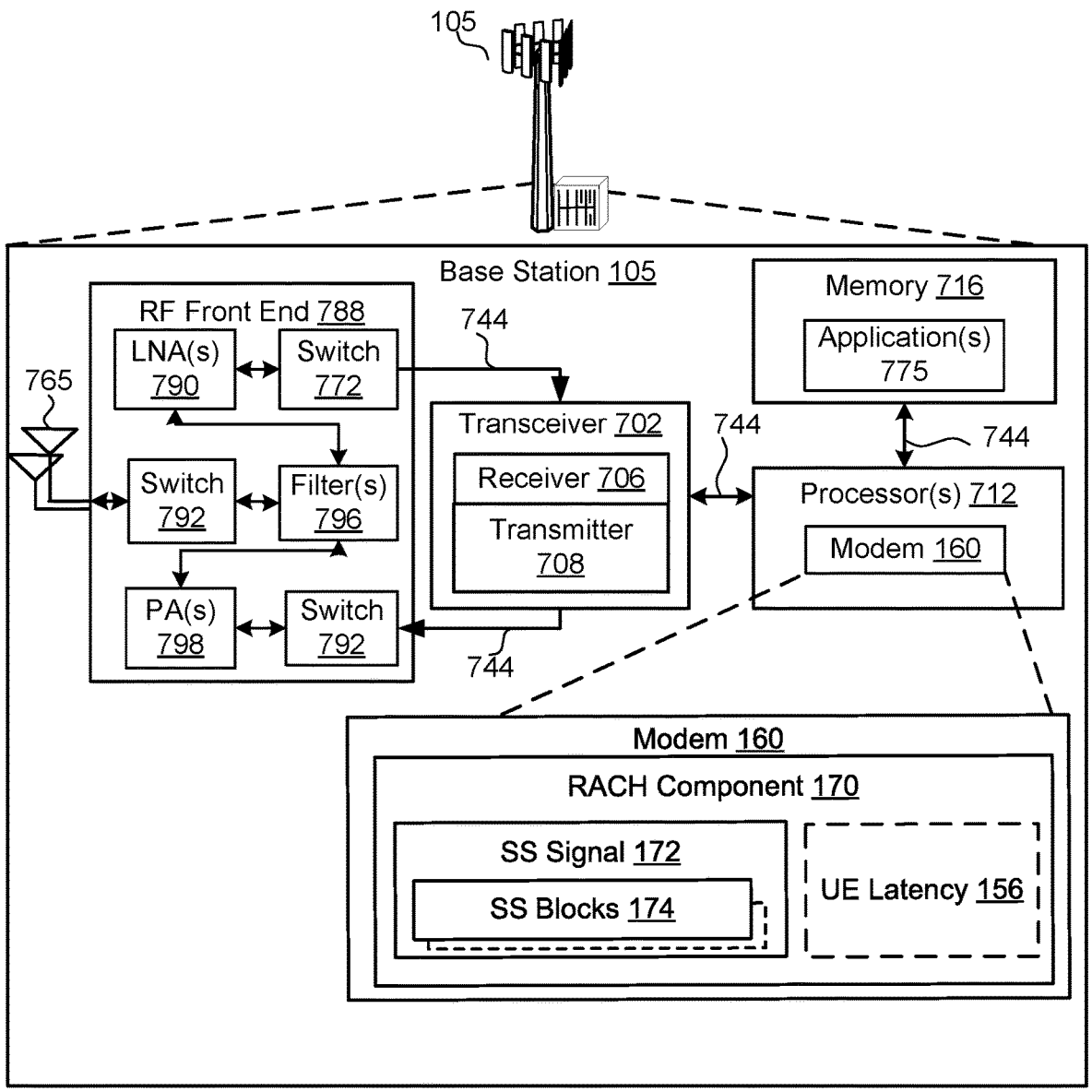
FIG. 7 is a schematic diagram of example components of the base station of FIG. 1.

Referring to FIG. 7, one example of an implementation of base station 105 may include a variety of components, some of which have already been described above, but including components such as one or more processors 712 and memory 716 and transceiver 702 in communication via one or more buses 744, which may operate in conjunction with modem 160 and RACH component 170 to enable one or more of the functions described herein related to configuring a UE 110 for transmitting a RACH Msg1 and/or receiving the RACH Msg1.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of UE 110, as described above, but configured or otherwise programmed for base station operations as opposed to UE operations.

Figure 8:
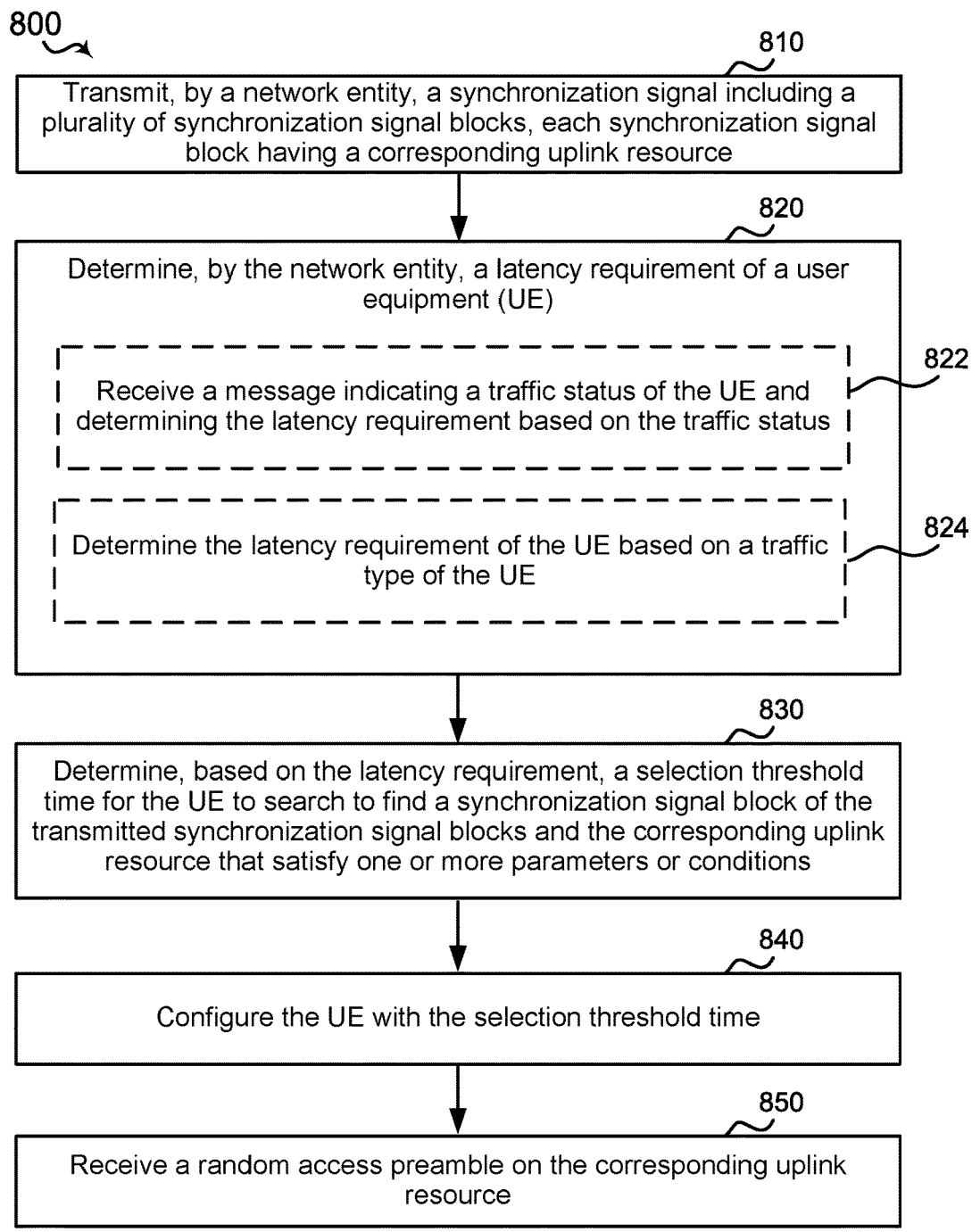
FIG. 8 is a flow diagram of an example method of receiving a RACH message based on synchronization signal blocks.

Referring to FIG. 8, for example, a method 800 of wireless communication in operating a network entity, such as a base station 105 according to the above-described aspects to configure a UE 110 for transmitting a RACH Msg 1 and/or to receive the RACH Msg1 from the UE 110.

At block 810, the method 800 may include transmitting, by a network entity, a synchronization signal including a plurality of synchronization signal blocks (e.g., SS block 174). Each synchronization signal block may have a corresponding uplink resource. In an aspect, for example, the RACH component 170 may transmit the SS signal 172 including the SS block 174. For instance, each SS block 174 may have a corresponding uplink resource 420.

At block 820, the method 800 may include determining, by the network entity, a latency requirement of a user equipment (UE). In an aspect, for example, the base station 105 may execute the RACH component 170 to determine the UE latency requirement 156 for a UE 110. For example, in block 822, the block 820 may include receiving a message indicating a traffic status of the UE and determining the latency requirement based on the traffic status. In an aspect, the RACH component 170 may receive the message indicating the traffic status of the UE 110 and determine the latency requirement 156 based on the traffic status. For example, a UE with a uplink traffic to transmit may have a relatively low latency requirement 156 compared to a UE with no uplink traffic to transmit. As another example, at block 824, the block 820 may include determining the latency requirement of the UE based on a traffic type of the UE. In an aspect, the RACH component 170 may determine the latency requirement 156 of the UE 110 based on the traffic type. The traffic type may be based on known downlink traffic for the UE or a type of connection for the UE.

At block 830, the method 800 may include determining, based on the latency requirement, a selection threshold time for the UE to search to find a synchronization signal block of the transmitted synchronization signal blocks and the corresponding uplink resource that satisfy one or more parameters or conditions. In an aspect, for example, the RACH component 170 may determine, based on the latency requirement 156, a threshold time 430, 432 for the UE 110 to search to find a synchronization signal block 174 of the transmitted synchronization signal blocks and the corresponding uplink resource 420 that satisfy one or more parameters or conditions.

At block 840, the method 800 may include configuring the UE with the selected threshold time. In an aspect, for example, the RACH component 170 may configure the UE 110 with the threshold time 430, 432. For example, the RACH component 170 may signal the selected threshold time to the UE 110.

At block 850, the method 800 may include receiving a random access preamble on the corresponding uplink resource. In an aspect, for example, the RACH component 170 may receive the random access preamble 301 on the corresponding uplink resource 420. For instance, the RACH component 170 may utilize receiver 706 to monitor each of the uplink resources having a SS block during the threshold time for the random access preamble, since the base station 105 does not know which uplink resource will be selected by the UE 110.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
   detecting, by a user equipment (UE), a random access procedure trigger;
   configuring a selection threshold time based at least in part on a latency requirement of the UE, wherein configuring the selection threshold time comprises receiving the selection threshold time from a serving base station based on the latency requirement of the UE for downlink traffic or requesting the selection threshold time from a serving base station based on the latency requirement of the UE for uplink traffic;
   selecting a synchronization signal block having a corresponding uplink resource within the selection threshold time from the random access procedure trigger, wherein the synchronization signal block and the corresponding uplink resource satisfy one or more parameters or conditions; and
   transmitting a random access preamble on the corresponding uplink resource.

2. The method of claim 1, wherein the random access procedure trigger is one of a handover command, an initial access, an idle state change, a connection re-establishment, or a beam failure recovery.

3. The method of claim 1, wherein selecting the synchronization signal block comprises determining that the synchronization signal block having the corresponding uplink resource satisfies a UE uplink power constraint.

4. The method of claim 1, wherein selecting the synchronization signal block comprises determining that the synchronization signal block having the corresponding uplink resource satisfies a downlink signal quality threshold.

5. The method of claim 1, wherein selecting the synchronization signal block comprises determining that the corresponding uplink resource is not subject to a maximum permissible exposure requirement.

6. The method of claim 1, wherein transmitting the random access preamble on the corresponding uplink resource comprises transmitting the random access preamble within a maximum transmit power.

7. The method of claim 1, wherein the selection threshold time is greater than or equal to a duration of a base station receive beam sweep, and wherein the synchronization signal block has a highest signal quality among received synchronization signal blocks.

8. The method of claim 1, wherein configuring the selection threshold time comprises:
   receiving a set of selection threshold times corresponding to different traffic types from a serving base station;
   determining a traffic type of current uplink traffic; and
   configuring the selection threshold time of the set of selection threshold times corresponding to the traffic type of the current uplink traffic.

9. The method of claim 1, wherein the one or more parameters or conditions include a network constraint and a UE constraint.

10. The method of claim 9, wherein the network constraint is a downlink signal quality and the UE constraint is a UE uplink power or a random access channel delay threshold.

11. The method of claim 1, wherein the random access preamble on the corresponding uplink resource is for a contention-free random access procedure.

12. A user equipment (UE), comprising:
   a memory; and
   a processor in communication with the memory, wherein the processor is configured to:
   detect, at the UE, a random access procedure trigger;
   configure a selection threshold time based at least in part on a latency requirement of the UE, wherein to configure the selection threshold time, the processor is configured to receive the selection threshold time from a serving base station based on the latency requirement of the UE for downlink traffic or requesting the selection threshold time from a serving base station based on the latency requirement of the UE for uplink traffic;

select a synchronization signal block having a corresponding uplink resource within the selection threshold time from the random access procedure trigger, wherein the synchronization signal block and the corresponding uplink resource satisfy one or more parameters or conditions; and transmit a random access preamble on the corresponding uplink resource.

13. The user equipment of claim 12, wherein the random access procedure trigger is one of a handover command, an initial access, an idle state change, a connection re-establishment, or a beam failure recovery.

14. The user equipment of claim 12, wherein the processor is configured to determine that the synchronization signal block having the corresponding uplink resource satisfies a UE uplink power constraint.

15. The user equipment of claim 12, wherein the processor is configured to determine that the synchronization signal block having the corresponding uplink resource satisfies a downlink signal quality threshold.

16. The user equipment of claim 12, wherein the processor is configured to determine that the corresponding uplink resource is not subject to a maximum permissible exposure requirement.

17. The user equipment of claim 12, wherein the processor is configured to transmit the random access preamble within a maximum transmit power.

18. The user equipment of claim 12, wherein the selection threshold time is greater than or equal to a duration of a base station receive beam sweep, and wherein the synchronization signal block has a highest signal quality among received synchronization signal blocks.

19. The user equipment of claim 12, wherein the processor is configured to:
receive a set of selection threshold times corresponding to different traffic types from a serving base station;
determine a traffic type of current uplink traffic; and
configure the selection threshold time of the set of selection threshold times corresponding to the traffic type of the current uplink traffic.

20. The user equipment of claim 12, wherein the one or more parameters or conditions include a network constraint and a UE constraint.

21. The user equipment of claim 20, wherein the network constraint is a downlink signal quality and the UE constraint is a UE uplink power or a random access channel delay threshold.

22. The user equipment of claim 12, wherein the random access preamble on the corresponding uplink resource is for a contention-free random access procedure.

23. A user equipment (UE), comprising:
means for detecting, by the UE, a random access procedure trigger;
means for configuring a selection threshold time based at least in part on a latency requirement of the UE, wherein the means for configuring the selection threshold time is configured to receive the selection threshold time from a serving base station based on the latency requirement of the UE for downlink traffic or request the selection threshold time from a serving base station based on the latency requirement of the UE for uplink traffic;
means for selecting a synchronization signal block having a corresponding uplink resource within the selection threshold time from the random access procedure trigger, wherein the synchronization signal block and the corresponding uplink resource satisfy one or more parameters or conditions; and
means for transmitting a random access preamble on the corresponding uplink resource.

24. A non-transitory computer-readable medium storing computer code executable by a processor for wireless communications, comprising one or more codes executable to:
detect, by a user equipment (UE), a random access procedure trigger;
configure a selection threshold time based at least in part on a latency requirement of the UE, wherein the one or more codes to configure the selection threshold time comprises one or more codes to receive the selection threshold time from a serving base station based on the latency requirement of the UE for downlink traffic or request the selection threshold time from a serving base station based on the latency requirement of the UE for uplink traffic;
select a synchronization signal block having a corresponding uplink resource within the selection threshold time from the random access procedure trigger, wherein the synchronization signal block and the corresponding uplink resource satisfy one or more parameters or conditions; and
transmit a random access preamble on the corresponding uplink resource.

\* \* \* \* \*